US011618714B2

(12) United States Patent
Seth et al.

(10) Patent No.: US 11,618,714 B2
(45) Date of Patent: Apr. 4, 2023

(54) METHODS OF FORMING CURED COMPOSITE MATERIALS WITH OPTIMIZED PH AND RELATED COMPOSITIONS AND SYSTEMS

(71) Applicant: Solidia Technologies, Inc., Piscataway, NJ (US)

(72) Inventors: Anuj Seth, Belle Mead, NJ (US); Jitendra Arunchandra Jain, Edison, NJ (US); Yussuf Sultan Ali, Fanwood, NJ (US); Matthew David Sulik, Township of Warren, NJ (US); Dishen Patel, Edison, NJ (US); Makar Makram Ibrahim, Piscataway, NJ (US)

(73) Assignee: Solidia Technologies, Inc., Piscataway, NJ (US)

( * ) Notice: Subject to any disclaimer, the term of this patent is extended or adjusted under 35 U.S.C. 154(b) by 42 days.

(21) Appl. No.: 17/067,149

(22) Filed: Oct. 9, 2020

(65) Prior Publication Data

US 2021/0107834 A1 Apr. 15, 2021

Related U.S. Application Data

(60) Provisional application No. 62/913,052, filed on Oct. 9, 2019.

(51) Int. Cl.
*B28B 17/02* (2006.01)
*C04B 14/06* (2006.01)
(Continued)

(52) U.S. Cl.
CPC .............. *C04B 28/08* (2013.01); *B28B 17/02* (2013.01); *C04B 14/06* (2013.01); *C04B 14/26* (2013.01);
(Continued)

(58) Field of Classification Search
CPC .......... C04B 28/08; C04B 14/06; C04B 14/26; C04B 28/188; C04B 38/02; C04B 38/103;
(Continued)

(56) References Cited

U.S. PATENT DOCUMENTS 4,880,610 A 11/1989 Constantz
2002/0155137 A1 10/2002 Lee et al.
(Continued)

OTHER PUBLICATIONS

Sandatlas. Dolomite (2011) [retrieved from the internet at Jun. 3, 2022 from <URL: https://www.sandatlas.org/dolomite/>] (Year: 2011).*

(Continued)

*Primary Examiner* — Kevin E Yoon
*Assistant Examiner* — Marites A Guino-O Uzzle
(74) *Attorney, Agent, or Firm* — Dentons US LLP

(57) ABSTRACT

A method of producing a carbonated composite material includes: providing a carbonatable cementitious material in particulate form; mixing the carbonatable cementitious material with water to produce a mix; forming a predetermined shape with the mix, wherein the predetermined shape has an initial pore structure containing an initial pore solution having a first pH; pre-conditioning the predetermined shape to remove a predetermined amount of the water from the predetermined shape to produce a pre-conditioned shape; carbonating the pre-conditioned shape in an environment comprising carbon dioxide to produce a modified pore structure containing a modified pore solution having and a second pH, wherein the difference between the first pH and the second pH is represented by a $\Delta pH$, and the $\Delta pH$ is 1.0 or less.

18 Claims, 13 Drawing Sheets

(51) Int. Cl.
  *C04B 14/26* (2006.01)
  *C04B 28/08* (2006.01)
  *C04B 38/10* (2006.01)
  *C04B 40/02* (2006.01)
  *C04B 28/18* (2006.01)
  *C04B 38/02* (2006.01)
  C04B 103/61 (2006.01)
  C04B 103/30 (2006.01)
  C04B 103/22 (2006.01)
  C04B 111/00 (2006.01)
  C04B 111/26 (2006.01)

(52) U.S. Cl.
  CPC .......... *C04B 28/188* (2013.01); *C04B 38/02* (2013.01); *C04B 38/103* (2013.01); *C04B 40/0231* (2013.01); *C04B 40/0236* (2013.01); C04B 2103/22 (2013.01); C04B 2103/302 (2013.01); C04B 2103/304 (2013.01); C04B 2103/61 (2013.01); C04B 2111/00612 (2013.01); C04B 2111/26 (2013.01); Y02P 40/18 (2015.11)

(58) Field of Classification Search
  CPC ........... C04B 40/0231; C04B 40/0236; C04B 2103/22; C04B 2103/302; C04B 2103/304; C04B 2103/61; C04B 2111/00612; C04B 2111/26; C04B 38/10; C04B 40/02; B28B 17/02; B28B 11/245; Y02P 40/18; Y02W 30/91
  See application file for complete search history.

(56) References Cited

U.S. PATENT DOCUMENTS

| | | |
|---|---|---|
| 2008/0241206 A1 | 10/2008 | Constantz |
| 2016/0168720 A1* | 6/2016 | Jain .................... C22C 47/04 148/287 |
| 2018/0273430 A1* | 9/2018 | Tas ...................... C04B 14/307 |
| 2019/0256415 A1* | 8/2019 | Jain ..................... C04B 28/188 |

OTHER PUBLICATIONS

Bentz, "A review of early-age properties of cement-based materials", Cement and Concrete Research, vol. 38, No. 2, Feb. 2008, pp. 196-204.

\* cited by examiner

METHODS OF FORMING CURED COMPOSITE MATERIALS WITH OPTIMIZED PH AND RELATED COMPOSITIONS AND SYSTEMS

The present application claims priority to and the benefit of U.S. Provisional Application No. 62/913,052 filed Oct. 9, 2019, pursuant to 35 U.S.C. § 119(e).

FIELD

The invention generally relates to composite materials.

BACKGROUND

In this specification where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

Concrete is omnipresent. Our homes likely rest on it, our infrastructure is built from it, as are most of our workplaces. Conventional concrete is made by mixing water and aggregates such as sand and crushed stone with ordinary portland cement (OPC), a synthetic material made by burning a mixture of ground limestone and clay, or materials of similar composition in a rotary kiln at a sintering temperature of around 1,450° C. OPC manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone. Conventional concrete production and use is not optimal in terms of both economics and environmental impact. Such conventional concrete production technologies involve large energy consumption and carbon dioxide emission, leading to an unfavorable carbon footprint. Furthermore, increasing scarcity of the supplies of limestone also negatively impacts the sustainability of the continued use of ordinary hydraulic cement formulations such as Portland cement.

This recognition was one of the factors leading to the development of carbonatable cement formulations. Carbonatable cement refers to cement that is principally cured by reaction with carbon dioxide, $CO_2$, in any of its forms, such as, gaseous $CO_2$ in the presence of water, $CO_2$ in the form of carbonic acid, $H_2CO_3$, or in other forms that permit the reaction of $CO_2$ with the non-hydraulic cement material. The curing process sequesters carbon dioxide gas within the cured material, thus providing obvious environmental benefits. By way of example, Solidia Cement™ has been heralded as a breakthrough technology, having been recognized, for example, as one of the top 100 new technologies by the R&D 100 awards. The production of Solidia Cement™ and its use in concrete reduces the $CO_2$ footprint of these materials by up to 70% when compared with Portland cement and its use in traditional hydraulic concrete. In addition, 80% of the water used in Solidia Cement based concrete making can be easily reclaimed and reused.

Precast concrete objects formed from OPC, such as pre-stressed concrete girders, beams and railway ties, typically include embedded plain carbon steel as reinforcement. In addition, cast-in-place concretes such as bridge deck slabs and pavements are often reinforced with steel. For example, reinforcing bars (rebar) are commonly steel bars or meshes of steel wires are regularly used as tension devices in reinforced concrete and reinforced masonry structures to strengthen as well as to hold the concrete in compression. Epoxy coated steel, galvanized steel, and/or stainless steel can also be used as reinforcement elements.

Hydration of OPC in the presence of water produces a solution within the porous material that consists mainly of alkali hydroxides, such as, $Ca(OH)_2$, NaOH and KOH. Depending on the composition of the cement and the aggregates, the pH of the pore solution is typically between 12.5 and 13.5. However, OPC can also undergo a carbonation reaction upon exposure to $CO_2$ under certain conditions. For example, $Ca(OH)_2$ can react with $CO_2$ to form $CaCO_3$ and $H_2O$. When conventional concrete undergoes carbonation, the pH of a solution of water and ions dissolved from cement (e.g., calcium, sodium and/or potassium ions) resident within pores of the material ("pore solution") drops to values approaching a pH of 9 as a consequence of drastic reduction in the concentration of hydroxyl ions. Penetration of salts from the environment may also lead to a remarkable change in the composition of the pore solution.

Corrosion of plain carbon steel in conventional concrete is initiated when a passive film on the surface of iron or steel (e.g., plain carbon steel) is removed either by lowering of the pore solution pH or by combination of low pore solution pH and presence of chlorides. During the service lifetime, OPC is affected by chloride penetration from salts during winter season and/or a carbonation reaction with atmospheric carbon dioxide ($CO_2$) that reduces the pore solution pH of conventional concrete. Corrosion products formed due to the corrosion are volumetrically expansive in nature. These corrosion products from the corrosion of the rebar can produce severe internal stresses on the surrounding OPC, leading to cracking, spalling, and ultimately, structural failure.

Similar to OPC based conventional concrete, carbonatable low calcium silicate based uncarbonated concrete materials, such as those described above (i.e., Solidia Cement™ and Solidia Concrete™) have a pore solution which has a high pH value when it is freshly mixed. However, upon carbonation, the pH value of the pore solution decreases during curing. The hardening of the material is facilitated through a curing process in which calcium silicates carbonate to form calcium carbonate. The pH value of the pore solution in a fully reacted low calcium silicate based carbonated concrete with compressive strength of 10,000 psi, or more, is significantly lower than the pH value when freshly mixed. With the pore solution having a low pH value, a passive film on the surface of reinforcing or embedded steel is susceptible to corrosion as soon as fresh water or chloride ions reaches the surface of the reinforcement material.

Thus, there is an on-going need for novel and improved material compositions and production processes that address the issues of corrosion of iron or steel (e.g., plain carbon steel) components in low calcium silicate based carbonatable non-hydraulic cement and concrete products.

While certain aspects of conventional technologies have been discussed to facilitate disclosure of the invention, Applicants in no way disclaim these technical aspects, and it is contemplated that the claimed invention may encompass or include one or more of the conventional technical aspects discussed herein.

SUMMARY

The invention includes novel curing methods and formulations that prevent, mitigate or delay the reduction in the pH of a pore solution in objects made from carbonatable low calcium silicate based cement ("CSC cement") upon curing.

For example, the compressive strength of CSC concrete is reaction dependent, and carbonated concrete objects can achieve a compressive strength of 10,000 psi or more. As is disclosed herein, with modification of mix design, and/or processing conditions, a compressive strength of about 3,000 to about 10,000 psi, or more, can be achieved in carbonated CSC with corresponding pore solution pH values of about 11.0, or more. This favorable pH value can provide protection to iron or steel in contact with CSC cement or CSC concrete and retards the corrosion thereof.

A number of aspects of the present invention will now be described. It should be understood that the inventors contemplate that any of features or aspects of the present invention listed below, or elsewhere described herein, can be combined in any order and in any number, with any other feature or aspect of the present invention described herein. Any and all such combinations, even if not explicitly set forth herein, are within the scope of the present invention and specifically contemplated as being embodiments of the present invention.

According to certain optional aspects a method of producing a carbonated composite material is provided comprising: providing a carbonatable cementitious material in particulate form; mixing the carbonatable cementitious material with water to produce a mix; forming a predetermined shape with the mix, wherein the predetermined shape has an initial pore structure containing an initial pore solution having a first pH; pre-conditioning the predetermined shape to remove a predetermined amount of the water from the predetermined shape to produce a pre-conditioned shape; carbonating the pre-conditioned shape in an environment comprising carbon dioxide to produce a modified pore structure containing a modified pore solution having a second pH, wherein the difference between the first pH and the second pH is represented by a ΔpH, and the ΔpH is 1.0 or less, 0.75 or less, 0.5 or less, 0.25 or less, or about 0.0.

The method as described above, optionally wherein the first pH is 11.5 or greater.

The method as described above, optionally wherein the second pH is at least about 9.5 to about 11.5, or greater.

The method as described above, optionally wherein the carbonation of the pre-conditioned shape forms one or more bonding elements, wherein each bonding element comprises: a core, wherein the core has a first chemical composition that includes one or more chemical elements; a silica-rich first layer at least partially covering a peripheral portion of the core; and a calcium carbonate and/or magnesium carbonate-rich second layer at least partially covering a peripheral portion of the first layer.

The method as described above, optionally wherein the predetermined amount of water removed from the predetermined shape during the pre-conditioning is between 20 to 60%, 25 to 60%, 30 to 60%, 35 to 60%, 40 to 60%, 20 to 55%, 25 to 55%, 30 to 55%, 35 to 55%, 40 to 55%, 20 to 50%, 25 to 50%, 30 to 50%, 35 to 50%, 40 to 50%, 20 to 45%, 25 to 45%, 30 to 45%, 35 to 45%, 20%-40%, 25%-40%, 30%-40%, or 35%-40%.

The method as described above, optionally wherein, at least part of the pre-conditioning is performed in an environment comprising ambient air.

The method as described above, optionally wherein, at least part of the pre-conditioning is done in an environment comprising carbon dioxide.

The method as described above, optionally wherein the concentration of carbon dioxide is greater than 0% to 50%.

The method as described above, optionally wherein the concentration of carbon dioxide during carbonation of the pre-conditioned shape is 10% to 100%.

The method as described above, optionally wherein the concentration of carbon dioxide during carbonation of the pre-conditioned shape is 50% to 99%.

The method as described above, optionally further comprising: forming the predetermined shape with the mix by pouring the mix into a mold; and pre-curing the mix while in the mold to at least a hardness sufficient to allow removal of the mold.

The method as described above, optionally wherein the mix comprises aggregates.

The method as described above, optionally wherein the aggregates have a particle size ranging from 0.25 mm to about 25 mm.

The method as described above, optionally wherein the aggregates comprise sand.

The method as described above, optionally wherein the aggregates comprise gravel, trap rock or granite stone.

The method as described above, optionally wherein the sand is dolomitic.

The method as described above, optionally wherein the sand is silica-based.

According to further aspects, the present invention provides calcium silicate based compositions that exhibit improved pore solution pH stability upon carbonation. Thus, according to certain aspects, there is provided a calcium silicate composition comprising solid components and liquid components; wherein the solid components comprise cementitious material in an amount of 8-25% by weight, based on the total weight of the solid components, and the remainder of the solid components are aggregate; and wherein the liquid components comprise a pH enhancer in an amount of 20-50 ml/kg of the cementitious material, and water in an amount of 200-700 ml/kg of the cementitious material.

The aggregate may comprise first relatively large aggregate, and a second relatively small aggregate.

The cementitious material may comprise a calcium silicate compound in an amount of at least 50% by weight based on the total weight of the cementitious material, and ordinary portland cement.

The cementitious material may further comprise a supplementary cementitious material (SCM), such as vitreous calcium alumino silicate.

The liquid components can further comprise one or more of: a water reducer, an air-entraining agent, and a set retarder.

Various aspects and features of the present invention will now be referenced below, and further explained in the Detailed Description.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Figure 1:
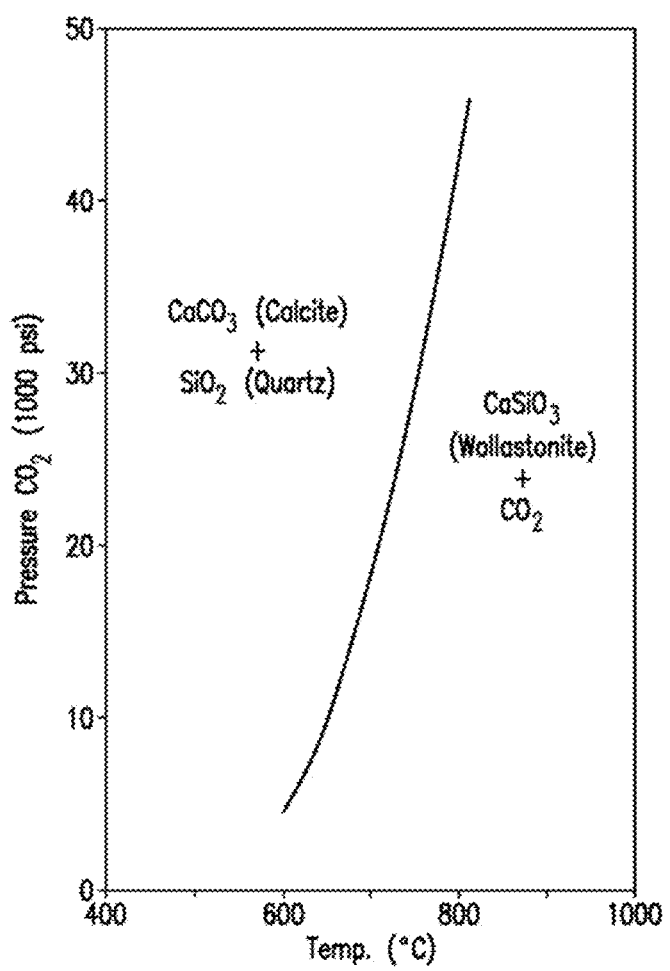
FIG. 1 is a pressure-temperature phase diagram showing the phases present in the reversible reaction $CaCO_3 + SiO_2 \leftrightarrow CaSiO_3$ (calcium silicate)$+CO_2$.
Figure 2:
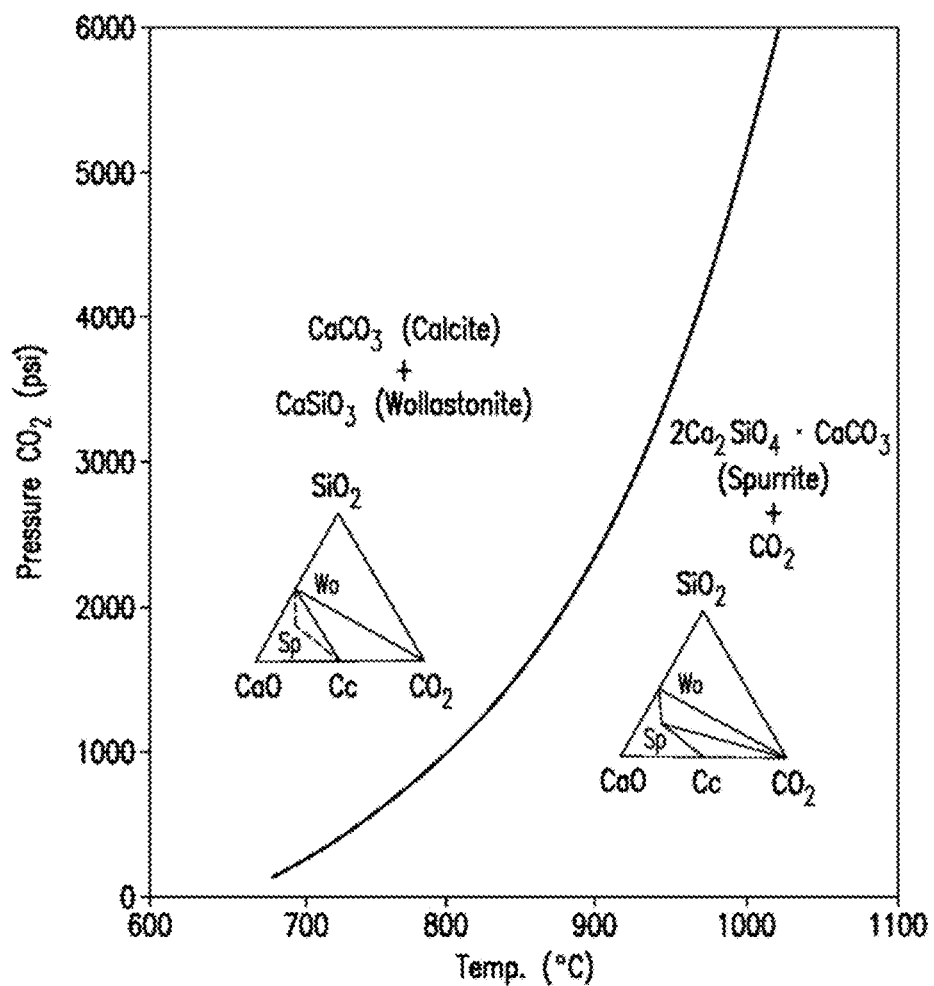
FIG. 2 is a pressure-temperature phase diagram showing the phases present in the reversible reaction $3CaCO_3 + 2CaSiO_3 \leftrightarrows 2Ca_2SiO_4 \cdot CaCO_3 + CO_2$.
Figure 3:
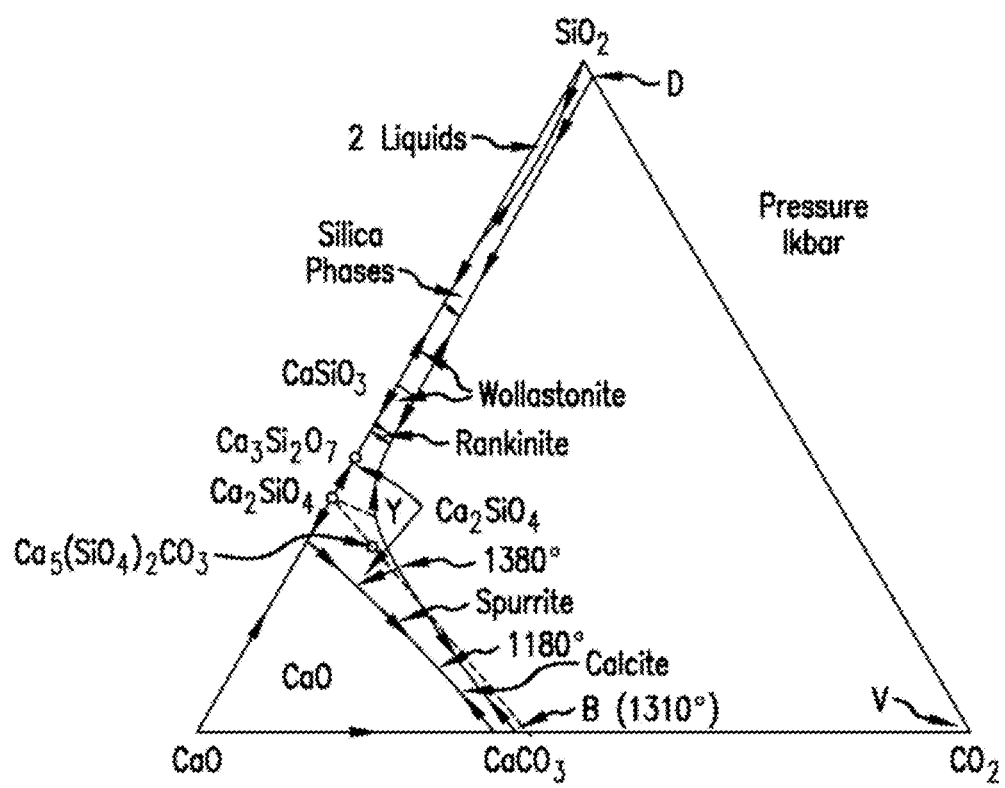
FIG. 3 is a phase diagram of the $CaO—SiO_2—CO_2$ system at a pressure of 1 kilobar.
Figure 4:
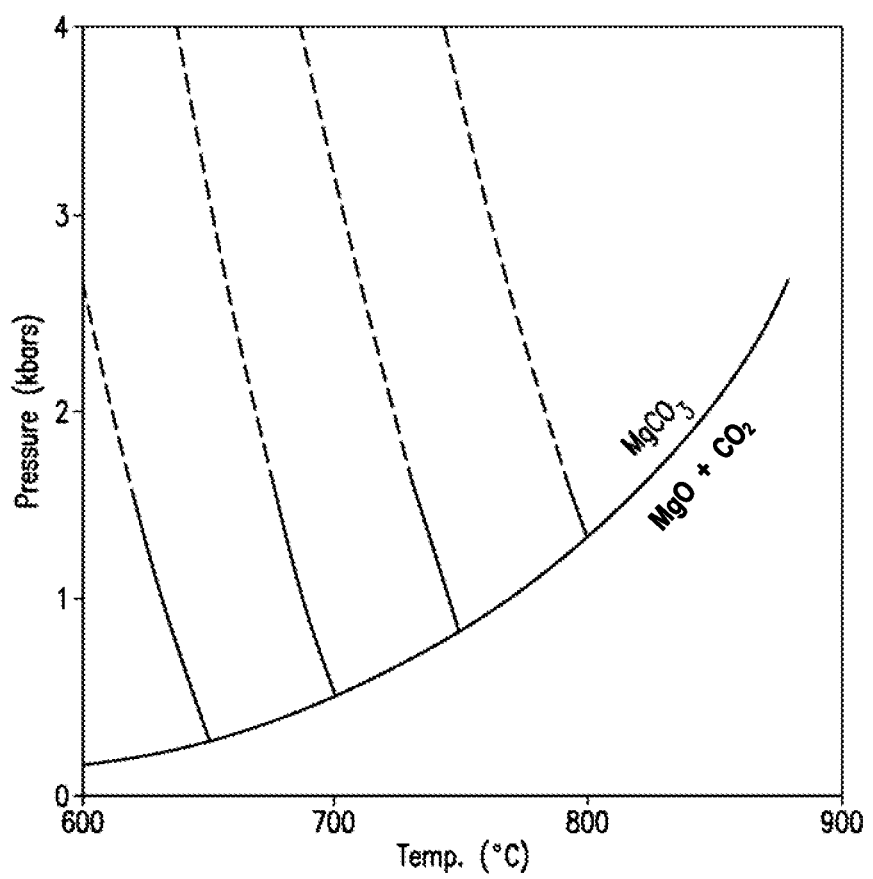
FIG. 4 is a pressure-temperature phase diagram showing the phases present in the reversible reaction $MgO + CO_2 \leftrightarrows MgCO_3$.
Figure 5:
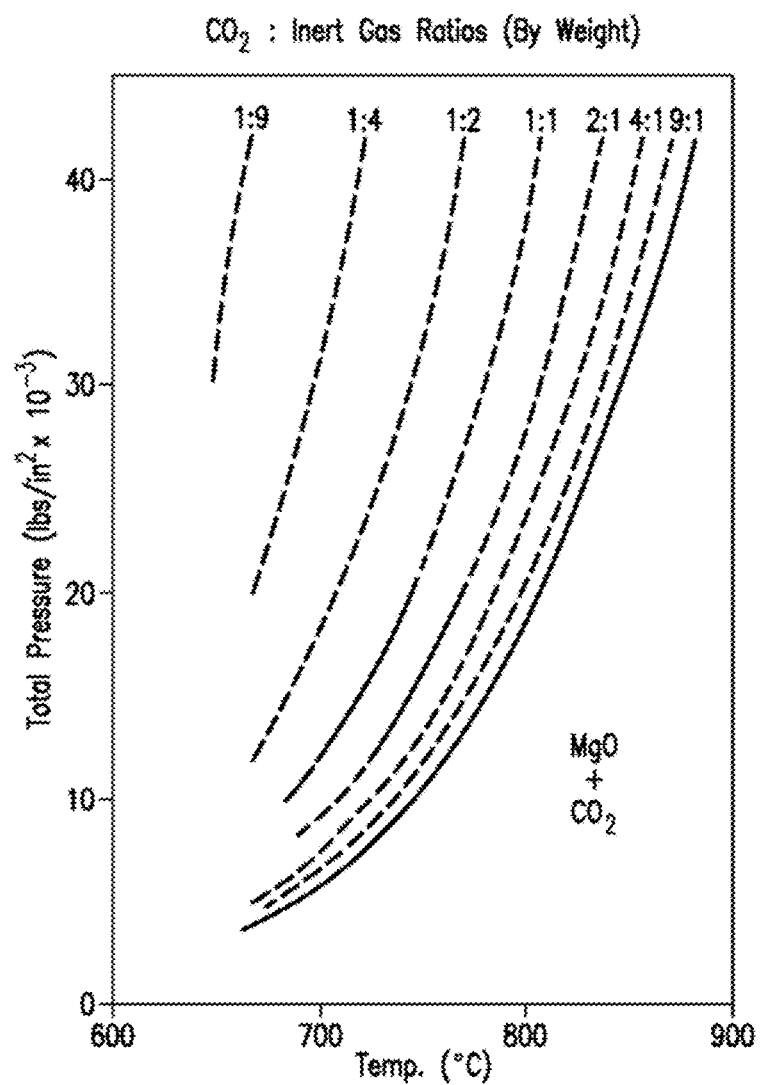
FIG. 5 is a pressure-temperature phase diagram showing the equilibrium curves for the reversible reaction $MgO + CO_2 \leftrightarrows MgCO_3$ as a function of the proportion of $CO_2$ in an inert gas.
Figure 6:
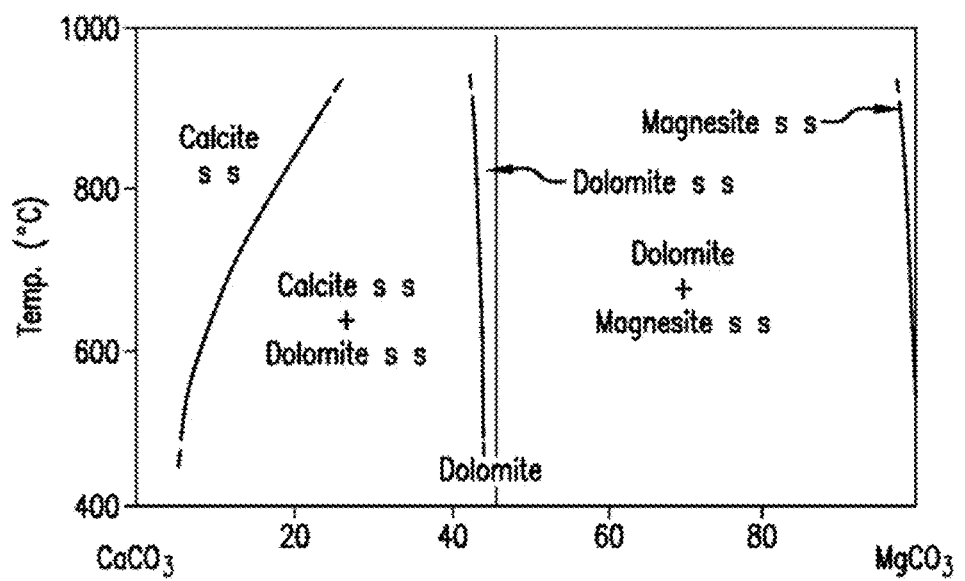
FIG. 6 is a temperature-composition phase diagram that illustrates the stability regions for various phases in the $CaCO_3—MgCO_3$ system.
Figure 7:
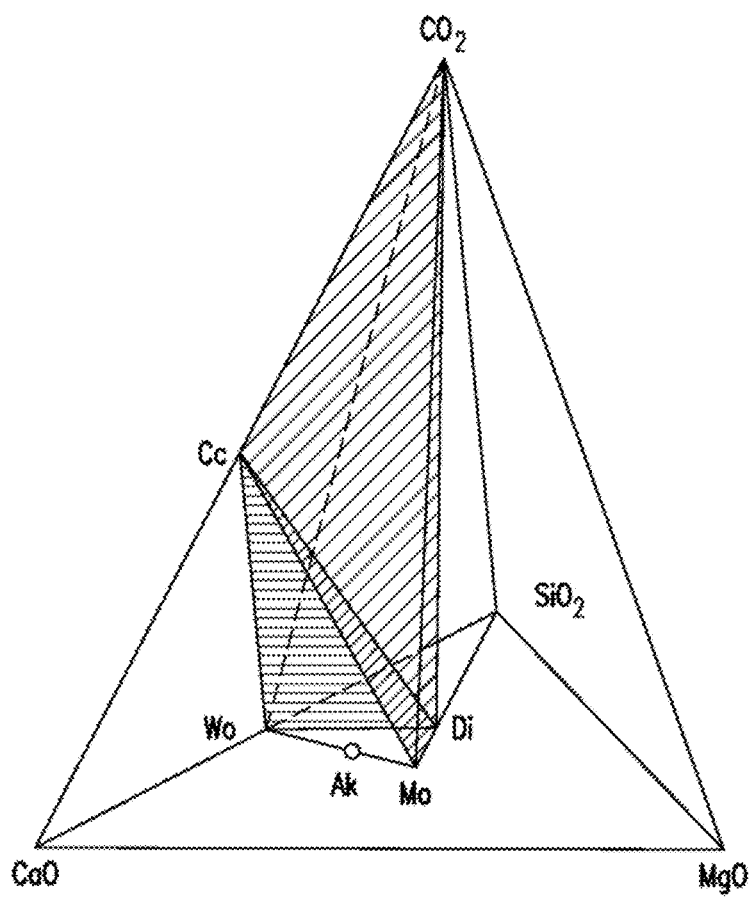
FIG. 7 is a tetrahedron diagram illustrating the phase relationships among the compounds CaO, MgO, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak. denotes Akermanite, Di denotes diopside, and Mo denotes monticellite ($CaMgSiO_4$).
Figure 8:
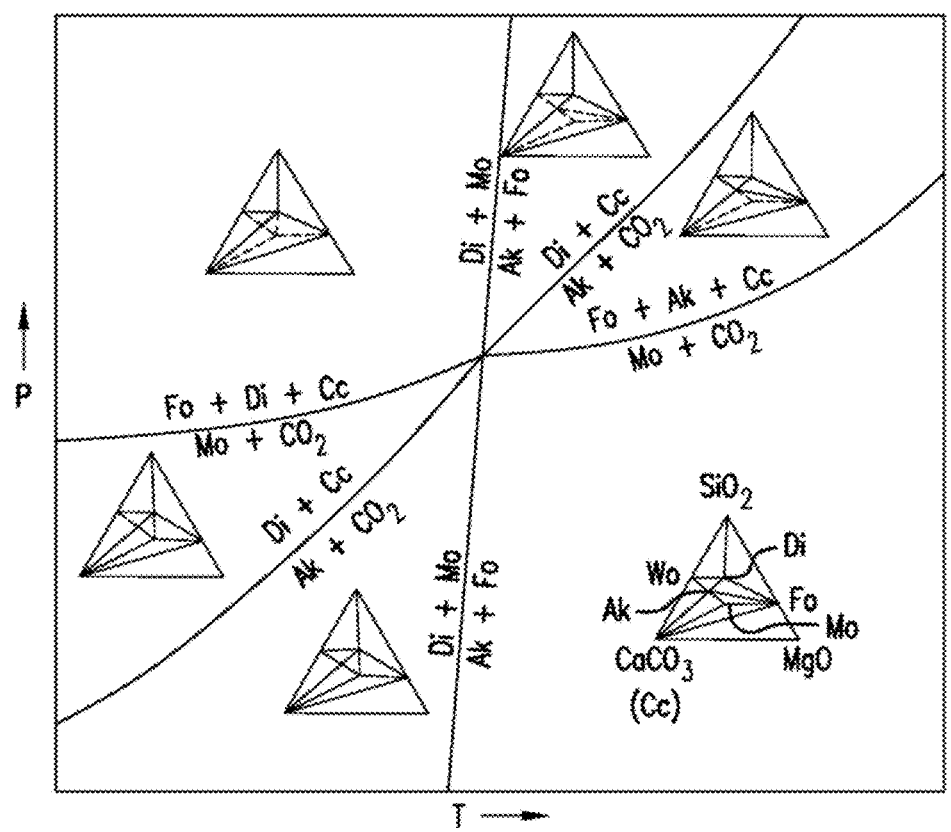
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

As used herein, the singular forms "a," "an" and "the" are intended to include the plural forms as well, unless the context clearly indicates otherwise. The use of "or" is intended to include "and/or", unless the context clearly indicates otherwise. Additionally, the use of "and" is intended to encompass "and/or," unless the context clear indicates otherwise.

As used herein, "about" is a term of approximation and is intended to include minor variations in the literally stated amounts, as would be understood by those skilled in the art. Such variations include, for example, standard deviations associated with techniques commonly used to measure the recited amounts.

All of the numerical values contained in this disclosure are to be construed as being characterized by the above-described modifier "about," are also intended to include the exact numerical values disclosed herein. The ranges disclosed herein should be construed to encompass all values within the upper and lower limits of the ranges, unless indicated otherwise. Moreover, all ranges include the upper and lower limits.

As used herein, low calcium silicate based cement or "CSC cement," means a material composed mainly of calcium silicates and having a Ca to Si atomic ratio of 0.8 to 2.0. "CSC concrete" means a composite formed from carbonated CSC cement.

As used herein, "pore solution" means a solution of water and ions dissolved from the components of the composite, such as, but not limited to the cement (e.g., calcium, sodium, and/or potassium ions), aggregates, and other additives, and residing in one or more pores present in a green, partially cured, or fully cured cement or concrete body or mass.

As used herein, "cementitious material" means a material that includes reactive filler material like vitreous calcium alumino silicate, fly ash, slag and ordinary portland cement (OPC), non-reactive filler like fine limestone powder, silica fume and glass powder. Cementitious content is total amount of cement and cementitious materials described herein.

As used herein, "high alkalinity concrete recycled materials" or "CRM" means aggregates retrieved from crushing old OPC based concrete elements like slabs, pavements, beams, and columns, and which has a pore solution pH greater than 11.5.

As used herein, "slag aggregate" means aggregates retrieved from crushing blast furnace slag in a coarse form and which has a pore solution pH greater than 11.0.

The invention provides compositions, production processes and systems that address pH reduction during curing of low calcium silicate cement-based composite material bodies, and in turn, enables prevention, mitigation or delay of corrosion of iron or steel components (e.g., plain carbon steel, epoxy coated steel, galvanized steel, and/or stainless steel, reinforcement bars or meshes) used with or at least partially embedded in the concrete composite materials, and objects made from carbonatable low calcium silicate based cement and concrete ("CSC cement" and "CSC concrete"). Thus, the present invention provides significant improvement in the service life and utility of manufactured reinforced low calcium silicate cement-based composite material and objects formed therefrom.

Thus, carbonated or cured low calcium silicate cement-based material, according to certain aspects of the present invention, has a plurality of pores with modified pore solution located in one or more of the pores having a pH of greater than about 9.5, preferably greater than about 10, preferably greater than about 11, preferably greater than about 11.5, preferably greater than about 12.0, preferably greater than about 12.5, preferably greater than about 13.0, and preferably about 13.5. The modified pore solution can have a pH from about 9.5 to about 13.5, inclusive of these upper and lower limits, and all integers and fractions encompassed within the range.

The CSC cement or concrete is formulated and/or cured under conditions that minimize the drop in pH from the initial pH of freshly mixed CSC cement or concrete, and fully cured CSC cement or concrete. As used herein "fully cured" means that a target compressive strength value has been achieved (e.g., a compressive strength of 3,000 psi or greater). This is referred to herein as "ΔpH." According to the present invention, the ΔpH is 1.0 or less, 0.75 or less, 0.5 or less, 0.25 or less, or about 0.0. The above-described ΔpH values are inclusive of upper and lower limits, and all integers and fractions encompassed within the range of these upper and lower limits.

These carbonated composite materials and objects not only provide an a beneficial pH environment that prevents, mitigates or delays corrosion but also afford adequate compressive strength required for service conditions, increased water resistance, all without affecting the material's freeze-thaw durability and suitability for cold weather applications.

The carbonated low calcium silicate cement-based composite material having at least one, or a plurality of pores, with the modified pore solution having a pH value as described above may also have a suitable compressive strength of, for example, 3,000 psi or greater, greater than about 4,000 psi, greater than about 5,000 psi, greater than about 6,000 psi, greater than about 7,000 psi, greater than about 8,000 psi, greater than about 9,000 psi, or equal to or greater than about 10,000 psi. The compressive strength may be from about 3,000 psi to about 10,000 psi, inclusive of these upper and lower limits, and all integers and fractions encompassed within the range. Such compressive strengths may be obtained from a total curing time of less than 7 days from the date of the beginning of carbonation, and about 8 hours or more. In certain embodiments, such compressive strengths can be obtained from a total curing time of less than about 14 days from the date of beginning carbonation, and about 8 hours or more. In other embodiments, such compressive strengths obtained from a total curing time of less than about 28 days from the date of beginning carbonation, and about 8 hours or more. Thus, the total curing times may range from about 8 hours to about 28 days. The total curing times include the upper and lower limits mentioned above, as well as all time values falling within the specified range. The total curing times include any optional pre-curing times, as further described herein.

The porous body may further include one or more water reducing agent(s), air entraining agent(s), set retarder(s), and/or combinations thereof, each at a dosage of 1 to 15 ml per kilogram of cementitious materials. These additives are added to the dry mix in a mixer along with low calcium silicate cement.

In one aspect, the low calcium silicate cement-based composite material having a plurality of pores with modified pore solution includes a bonding matrix, the bonding matrix comprising a plurality of bonding elements, each bonding element comprises a core, wherein the core comprises of a carbonatable material, a first silica-containing layer that at least partially covers at least some peripheral portion of the core, and a second calcium and/or magnesium carbonate-containing layer that at least partially covers some peripheral portion of the first silica-containing layer. In certain embodiments, the core comprises at least one synthetic formulation comprising calcium or magnesium, silicon, and oxygen. In other embodiments, the bonding matrix is prepared from a porous body, wherein the porous body comprises a plurality of precursor particles, and the precursor particles are transformed into the bonding elements.

Figure 11A:
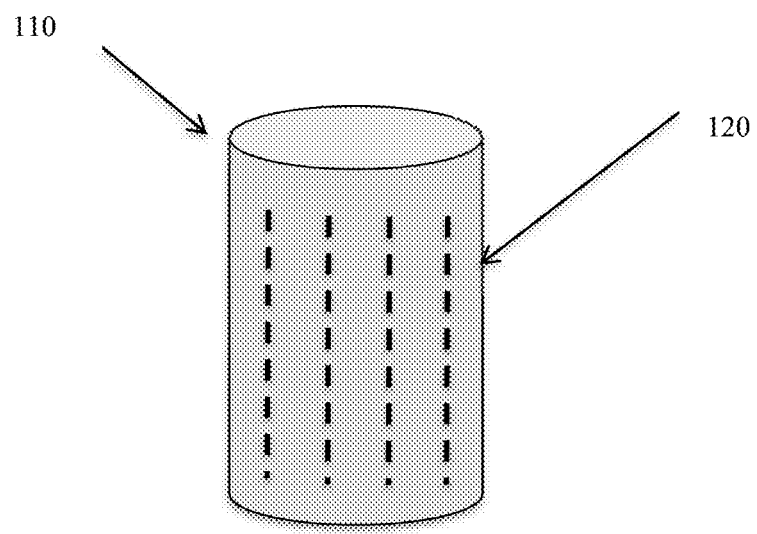
FIGS. 11A-11B are exemplary porous low calcium silicate based cement bodies with metal reinforcement elements disposed therein.
Figure 11B:
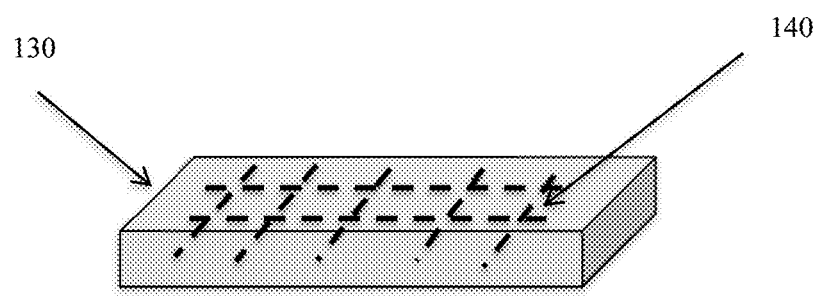

In another aspect, as illustrated in FIGS. 11A-11B, the invention generally relates to a concrete object (110, 130) comprising a low calcium silicate cement-based composite material having a modified pore solution, and one or more iron or steel components (120, 140) at least partially embedded therein. In certain embodiments, the one or more iron or steel components is made of plain carbon steel epoxy coated steel, galvanized steel, and/or stainless steel. In certain embodiments, the one or more iron or steel components is a reinforcement bar or mesh (140).

In yet another aspect, the invention generally relates to methods of making low calcium silicate cement composite materials and objects made therefrom. A method of making a carbonated low calcium silicate cement-based material includes: mixing a low calcium silicate cement with water, and filler particles comprising CaO or $SiO_2$ having a particle size of 0.1 µm to 1000 µm, to form a wet mixture, casting the wet mixture in a mold, wherein the cast wet mixture has a plurality of pores that contain at least some of the water, wherein the water dissolves at least some elements from the low calcium silicate cement and/or the filler particles to produce a pore solution, wherein the pore solution in the cast wet mixture has a pH of 11.5 or greater; optionally pre-curing the cast wet mixture to provide the cast wet mixture with sufficient hardness to be removed from the mold; removing the cast wet mixture or pre-cured cast wet mixture from the mold; pre-conditioning the cast wet mixture to by removing at least some of the water from the cast wet mixture; and curing the porous body comprising pores containing the pore solution under the conditions of: a pressure from about atmospheric pressure to about 30 psi, a temperature in the range from about 30° C. to about 90° C., a relative humidity of about 10% to about 90%, an atmosphere of a $CO_2$ gas concentration of about 15% to about 100%, and for a duration of about 8 hours to about 28 days, to form the low calcium silicate cement-based carbonated material comprising pores containing a modified pore solution. The modified pore solution in the cured low calcium silicate cement-based carbonated composite material has a pH of at least about 9.5 to about 11.5, or greater. The pH of the modified pore solution is inclusive of these upper and lower limits, and all integers and fractions encompassed within the range. The pH of the modified pore solution may be at least 10.0, at least 10.5, at least 11.0, or at least about 11.5. The pH of the modified pore solution may be greater than about 11.5, depending on the pH of the pores solution. The low calcium silicate cement-based carbonated material may have a compressive strength of, for example, 3,000 psi or greater, greater than about 4,000 psi, greater than about 5,000 psi, greater than about 6,000 psi, greater than about 7,000 psi, greater than about 8,000 psi, greater than about 9,000 psi, or equal to or greater than about 10,000 psi. The compressive strength may be from about 3,000 psi to about 10,000 psi, inclusive of these upper and lower limits, and all integers and fractions encompassed within the range.

The optional pre-curing of the cast mixture can be performed under the following conditions: a pressure of about atmospheric pressure to about 30 psi, a temperature of about 30° C. to about 90° C. (e.g., about 30° C. to about 80° C., about 30° C. to about 70° C., about 30° C. to about 60° C., about 30° C. to about 50° C., about 40° C. to about 90° C., about 50° C. to about 90° C., about 60° C. to about 90° C.), a relative humidity of about 10% to about 90% (e.g., about 10% to about 70%, about 10% to about 50%, about 10% to about 30%, about 20% to about 90%, about 40% to about 90%, about 60% to about 90%), an atmosphere comprising ambient air, $CO_2$ gas, or a combination of the two either sequentially or a mixed environment containing both, with a $CO_2$ concentration (when present) of about 15% to about 100% (e.g., about 15%, about 15% to about 90%, about 15% to about 80%, about 15% to about 70%, about 30% to about 90%, about 30% to about 80%, about 30% to about 70%, about 40% to about 100%, about 50% to about 100%, about 60% to about 100%), and for a duration of about 3 hours to about 14 days (e.g., about 3 hours to 7 days, about 3 hours to 4 days, about 3 hours to 3 days, about 3 hours to 2 days, about 3 hours to 36 hours, about 3 hours to 24 hours, about 3 hours to 12 hours, about 6 hours to 14 days, about 12 hours to 14 days, about 20 hours to 14 days, 1 to 14 days, about 3 to 14 days, about 7 to 14 days). All of the above values include the specified upper and lower limits, as well as all integers encompassed within the ranges.

The pre-conditioning of the cast wet mixture can take place while the cast wet mixture is still contained within a mold, or can be performed after the cast wet mixture has been removed from a mold. The pre-conditioning of the cast wet mixture is performed under the following conditions: a pressure of about atmospheric pressure (atmospheric pressure to 30 psi), a temperature of about 23° C. to 85° C., a relative humidity of about 10% to 70%, an atmosphere comprising ambient air, $CO_2$ gas, or a combination of the two either sequentially or a mixed environment containing both, with a $CO_2$ concentration (when present) of about 10 to 100%, and for a duration of about 3 to 24 hours. The pre-conditioning may be performed under conditions including, but not limited to those conditions set forth above, in a manner such that a targeted or predetermined amount of moisture is removed from the cast wet mixture. The targeted or predetermined amount of moisture removed from the cast wet mixture can be 20% to 60%, 25% to 60%, 30% to 60%, 35% to 60%, 40% to 60%, 20% to 55%, 25% to 55%, 30% to 55%, 35% to 55%, 40% to 55%, 20% to 50%, 25% to 50%, 30% to 50%, 35% to 50%, 40% to 50%, 20% to 45%, 25% to 45%, 30% to 45%, 35% to 45%, 40% to 45%, 20% to 40%, 25% to 40%, 30% to 40% or 35% to 40%, of the total amount of water present in the cast wet mixture prior to pre-conditioning, preferably about 30% to about 50% of the amount of water contained in the cast wet mixture prior to pre-conditioning. The cast wet mixture can be formed with any initial amount of water present prior to pre-conditioning. For example, the cast wet mixture can comprise 5% to 7% water, relative to the total weight of the cast wet mixture prior to pre-conditioning. All of the above values include the specified upper and lower limits, as well as all integers and fractions encompassed within the ranges.

In some embodiments, prior to the curing step, the pre-cured cast mixture is cut or otherwise manipulated into a desired product shape.

In certain embodiments of the methods, curing is performed under the following conditions to form the carbonated low calcium silicate cement composite materials and objects made therefrom: a pressure from about atmospheric pressure to about 30 psi, a temperature of about 30° C. to about 90° C., a relative humidity of about 10% to about 90%, an atmosphere comprising $CO_2$ gas at a concentration of about 15% to about 100%. Total curing time is less than 7 days from the date of the beginning of carbonation, and about 8 hours or more. In certain embodiments, a total curing time is less than about 14 days from the date of beginning carbonation, and about 8 hours or more. In other embodiments, a total curing time is less than about 28 days from the date of beginning carbonation, and about 8 hours or more. Thus, the total curing times may range from about 8 hours to about 28 days. The total curing times and conditions include the upper and lower limits mentioned above, as well as all integers and fractions falling within the specified range. The total curing times include any optional pre-curing times, as further described herein. Curing can be carried out as a single curing step on the cast mixture. Alternatively, curing can be performed in two or more stages. For example, the cast mixture can be pre-cured, the pre-cured body removed from its mold, and subsequently cured in an additional phase. The curing conditions described above apply to the mandatory curing step that imparts adequate carbonation and final strength. The same conditions can be used for pre-curing and/or pre-conditioning, except that the pre-curing and/or pre-conditioning atmosphere can comprise ambient air, $CO_2$ gas, or a combination of the two either sequentially or a mixed environment containing both. Alternatively, while each phase of curing is conducted within the pressure, temperature and carbon dioxide concentration ranges described above, the total curing time is no more than 28 days in length, no more than 14 days in length, no more than 7 days in length, no more than 24 hours in length, or no more than 20 hours in length.

In certain embodiments of the methods, the methods optionally include adding one or more pH enhancing additives during the process of forming a porous body. Such pH enhancing additive(s) include: calcium nitrate tetrahydrate, calcium nitrite, NaOH, sodium bicarbonate, OPC, sodium silicate, deadburned CaO, deadburned MgO, high alkalinity concrete recycled material (CRM), slag aggregate, and combinations thereof. The pH enhancing additive(s) can be added to the formulation at dosage of about 1% to about 20%, by mass, of the total amount of cementitious materials. These additives are added to the dry mix in a mixer along with low calcium silicate cement. As used herein "deadburned" CaO and MgO are oxides of calcium and magnesium having little or no reactivity as a result of being calcined at high temperatures.

In certain embodiments of the methods, the porous body further includes adding one or more additives to improve water resistance (e.g., Class C fly ash, Class F fly ash, ground granulated blast furnace slag (GGBFS), fine glass powder, vitreous calcium aluminosilicate, silica fume, limestone powder, and combination thereof). The water resistance additives are included at dosage of about 1% to about 20%, by mass, relative to the total amount of cementitious materials. These additives can be added to the dry mix in a mixer along with low calcium silicate cement.

In certain embodiments of the methods, optionally, one or more water reducing agents, air entraining agents, set retarders, and combinations can be added during the process of forming the porous body.

In certain embodiments of the methods, optionally, the porous body has fully or partially embedded therein one or more iron or steel components (e.g., made of plain carbon steel, epoxy coated steel, galvanized steel, or, stainless steel), such as reinforcement bars or meshes.

In further embodiments of the method, the green (uncarbonated) porous body made from low calcium silicate cement is characterized by a plurality of pores having in one or more pores therein a pore solution with an initial pH (i.e., prior to curing or pre-curing) greater than about 11.5, or greater than about 12 (e.g., greater than about 12.5, or greater than about 13).

In other embodiments of the methods, the low calcium silicate cement porous body is carbonated, including any optional pre-curing, pre-conditioning, and curing phases under the conditions described herein, to render low calcium silicate cement materials and objects made therefrom having a plurality of pores with a modified pore solution in one or more pores therein with a pH of greater than about 9.5, preferably greater than about 10, preferably greater than about 10.5, preferably greater about 11, preferably greater than about 11.5, preferably greater than about 12.0, preferably greater than about 12.5, preferably greater than about 13.0, and preferably about 13.5. The modified pore solution can have a pH from about 9.5 to about 13.5, inclusive of these upper and lower limits, and all integers and fractions encompassed within the range.

The methods of the present invention are performed under the conditions described above with the additional proviso that the $\Delta$pH is 1.0 or less, 0.75 or less, 0.5 or less, 0.25 or less, or about 0.0. The above-described ΔpH values are inclusive of upper and lower limits, and all integers encompassed within the range of these upper and lower limits, and all integers and fractions encompassed within the range.

In certain embodiments of the methods, the methods are performed under conditions that render low calcium silicate cement materials and objects made therefrom described herein characterized by a compressive strength of, for example, 3,000 psi or greater, greater than about 3,500 psi, greater than about 4,000 psi, greater than about 5,000 psi, greater than about 6,000 psi, greater than about 7,000 psi, greater than about 8,000 psi, greater than about 9,000 psi, or equal to or greater than about 10,000 psi. The compressive strength may be from about 3,000 psi to about 10,000 psi, inclusive of these upper and lower limits, and all integers and fractions encompassed within the range. Such compressive strengths may be obtained from a total curing time of less than 7 days from the date of the beginning of carbonation, and about 8 hours or more. In certain embodiments, such compressive strengths obtained from a total curing time of less than about 14 days from the date of beginning carbonation, and about 8 hours or more. In other embodiments, such compressive strengths obtained from a total curing time of less than about 28 days from the date of beginning carbonation, and about 8 hours or more. Thus, the total curing times may range from about 8 hours to about 28 days. The total curing times include the upper and lower limits mentioned above, as well as all time values falling within the specified range. The total curing times include any optional pre-curing times, as further described herein. The curing and optional pre-curing conditions are previously described herein.

Precast Objects of Carbonatable Low Calcium Silicate Cements

The term "low calcium silicate" is previously defined herein. "Carbonatable," as used herein, refers to a material that is reactive with $CO_2$ via a carbonation reaction under a condition disclosed herein. A material is "uncarbonatable" if it is unreactive with $CO_2$ via a carbonation reaction under a condition disclosed herein. Exemplary carbonatable calcium silicate phases include CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta$-$Ca_2SiO_4$ or larnite, $Ca_7Mg(SiO_4)_4$ or bredigite, $\alpha$-$Ca_2SiO_4$ or $\gamma$-$Ca_2SiO_4$, and sometimes formulated as $Ca_2SiO_4$ or $2CaO.SiO_2$). Amorphous phases can also be carbonatable depending on their composition. Each of these materials may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight. Exemplary uncarbonatable or inert phases include melilite (($Ca,Na,K)_2$[(Mg, $Fe^{2+}$, $Fe^{3+}$, Al, Si)$_3O_7$]) and crystalline silica ($SiO_2$).

It should be understood that, low calcium silicate compositions, phases and methods disclosed herein can be adapted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

In exemplary embodiments, ground calcium silicate composition is used. The ground calcium silicate composition may have a mean particle size, measured using commercially available particle size analyzer, such as Mastersizer 2000, of about 1 μm to about 100 μm (e.g., about 1 μm to about 90 μm, 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 1 μm to about 5 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm). The ground calcium silicate composition may have a bulk density of about 0.5 g/mL to about 3.5 g/mL (e.g., 0.5 g/mL, 1.0 g/mL, 1.5 g/mL, 2.0 g/mL, 2.5 g/mL, 2.8 g/mL, 3.0 g/mL, 3.5 g/mL), a tapped density of about 1.0 g/mL to about 1.2 g/mL, and a Blaine surface area of about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 $m^2$/kg, 600 $m^2$/kg, 650 $m^2$/kg, 700 $m^2$/kg). The "Blaine surface area" is a measure of the fineness of cement, and is measured by the ASTM C204 method.

In exemplary embodiments of the low calcium silicate composition of the invention, ground calcium silicate having a $d_{10}$ particle size greater than 1 μm is utilized in the composition.

Any suitable aggregate may be used to form composite materials from the carbonatable composition of the invention, for example, calcium oxide-containing and/or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size of about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Chemical admixtures may also be included in the composite material; for example, plasticizers, retarders, accelerators, dispersants and other rheology-modifying agents. Certain commercially available chemical agents such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

Carbonatable Calcium Silicate Based Composite Compositions with Improved pH Stability According to further aspects, the present invention provides calcium silicate based compositions that exhibit improved pore solution pH stability upon carbonation. Thus, according to certain aspects, there is provided a calcium silicate composition comprising solid components and liquid components; wherein the solid components comprise cementitious material in an amount of 8-25% by weight, based on the total weight of the solid components, and the remainder of the solid components are aggregate; and wherein the liquid components comprise a pH enhancer in an amount of 20-50 ml/kg of the cementitious material, and water in an amount of 200-700 ml/kg of the cementitious materials.

The aggregate may comprise first relatively large aggregate, and a second relatively small aggregate.

The cementitious material may comprise a calcium silicate compound in an amount of at least 50% by weight based on the total weight of the cementitious material, and ordinary portland cement.

The cementitious material may further comprise a supplementary cementitious material (SCM), such as vitreous calcium alumino silicate.

The liquid components can further comprise one or more of: a water reducer, an air-entraining agent, and a set retarder.

Additional compositions can also be formulated according to the teachings of the following Table

TABLE 1

| Solid components | % by mass of solids in solid components | |
|---|---|---|
| | Example | Range, % |
| Cementitious materials* | 17.3 | 8-25 |
| Construction sand | 38.1 | 0-50 |
| ¼"-⅜" aggregate | 24.3 | 10-45 |
| ⅜"-1" aggregate | 20.3 | 0-50 |
| 1"-2" aggregates | 0 | 0-25 |

| Liquid components | ml/kg of cementitious materials | |
|---|---|---|
| | Example | Range |
| Water reducer (e.g. Glenium 7500) | 7 | 0-15 |
| Air entraining agent (e.g. MBAE90) | 1.5 | 0-12 |
| Set retarder ((e.g. Sika Plastiment) | 5 | 0-15 |
| Corrosion inhibitor (e.g. calcium nitrate tetrahydrate) | 20 | 0-50 |
| Water | 330 | 200-700 |

Notes:
*Cementitious materials may optionally include a calcium silicate based compound, such as Solidia Cement™, and optionally one or more of OPC and another supplementary cementitious material such as vitreous calcium alumino silicate. Thus, according to one example, the cementitious material may have a composition including Solidia Cement™ (12.8%) + OPC (3.46%,) + Supplementary cementing material (vitreous calcium alumino silicate) (1.04%).
The calcium silicate compound (e.g., Solidia Cement™) can be used in the range 50 to 100%, pH modifier (e.g., OPC, calcium nitrate tetrahydrate) can be used in the range from 0 to 30%, and SCM can be used in the range between 0 and 10%.

Carbonation of CSC Cements

A major utility of the carbonatable CSC composition is that it can be carbonated to form composite materials that are useful in a variety of applications.

The following reactions are believed to take place during carbonation of calcium silicate as disclosed herein.

  (1)

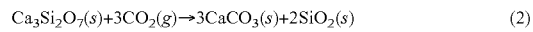  (2)

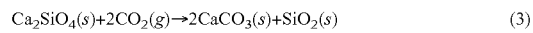  (3)

Generally, $CO_2$ is introduced as a gas phase that dissolves in an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

The $CaCO_3$ produced from these or any other $CO_2$ carbonation reactions disclosed herein may exist as one or more of several $CaCO_3$ polymorphs (e.g., calcite, aragonite, and vaterite). The $CaCO_3$ particles are preferably in the form of calcite but may also be present as aragonite or vaterite or as a combination of two or three of the polymorphs (e.g., calcite/aragonite, calcite/vaterite, aragonite/vaterite or calcite/aragonite/vaterite).

Any suitable grade of $CO_2$ may be used depending on the desired outcome of carbonation. For example, industrial grade $CO_2$ at about 99% purity may be used, which is commercially available from a variety of different industrial gas companies, such as Praxair, Inc., Linde AG, Air Liquide, and others. The $CO_2$ supply may be held in large pressurized holding tanks in the form of liquid carbon dioxide regulated at a temperature such that it maintains a desired vapor pressure, for example, of approximately 300 PSIG. This gas is then piped to a $CO_2$ curing (carbonation) enclosure or chamber. In the simplest system, $CO_2$ is flowed through the enclosure at a controlled rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

The carbonation, for example, may be carried out reacting it with $CO_2$ via a controlled Hydrothermal Liquid Phase Sintering (HLPS) process to create bonding elements that hold together the various components of the composite material. For example, in preferred embodiments, $CO_2$ is used as a reactive species resulting in sequestration of $CO_2$ and the creation of bonding elements in the resulting composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295,402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074,692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. Pub. No. US 2017/0341989 (application Ser. No. 15/609,908), U.S. application Ser. No. 15/716,392, filed Sep. 26, 2017, U.S. application Ser. No. 15/831,135, filed Dec. 4, 2017, each of which is expressly incorporated herein by reference in its entirety for all purposes.

FIGS. 1-8 are phase diagrams that show various phase interrelationships among some of the materials described herein.

Bonding Elements

The carbonation process produces a carbonated composite material and objects that microscopically includes a plurality of bonding elements having one or more types of microstructure. Collectively, the plurality of bonding elements form an inter-connected bonding matrix creating bonding strength and holding the composite material. For example, the microstructured bonding elements may be: a bonding element comprising a core of an unreacted carbonatable phase of calcium silicate fully or partially surrounded by a silica rich layer of varying thickness that is fully or partially encased by $CaCO_3$ particles; a bonding element comprising a core of silica formed by carbonation of a carbonatable phase of calcium silicate fully or partially surrounded by a silica rich layer of varying thickness that is fully or partially encased by $CaCO_3$ particles; a bonding element comprising a core of silica formed by carbonation of a carbonatable phase of calcium silicate and fully or partially encased by $CaCO_3$ particles; a bonding element comprising a core of an uncarbonatable phase fully or partially encased by $CaCO_3$ particles; a bonding element comprising a multi-phase core comprised of silica formed by carbonation of a carbonatable phase of calcium silicate and partially reacted calcium silicate, which multi-phase core is fully or partially surrounded by a silica rich layer of varying thickness that is fully or partially encased by $CaCO_3$ particles; a bonding element comprising a multi-phase core comprised of an uncarbonatable phase and partially reacted calcium silicate, which multi-phase core is fully or partially surrounded by a silica rich layer of varying thickness that is fully or partially encased by $CaCO_3$ particles; or a bonding element comprising particles of partially reacted calcium silicate without a distinct core and silica layer encased by $CaCO_3$ particles; and a bonding element comprising porous particles without a distinct silica layer encased by $CaCO_3$ particles.

The silica rich layer generally displays a varying thickness within a bonding element and from bonding element to bonding element, typically of about 0.01 µm to about 50 µm. In certain preferred embodiments, the silica rich layer has a thickness of about 1 µm to about 25 µm. As used herein, "silica rich" generally refers to a silica content that is significant among the components of a material, for example, silica being greater than about 50% by volume. The remainder of the silica rich layer is comprised largely of $CaCO_3$, for example about 10% to about 50% of $CaCO_3$ by volume. The silica rich layer may also include inert or unreacted particles, for example about 10% to about 50% of melilite by volume. A silica rich layer generally displays a transition from being primarily silica to being primarily $CaCO_3$. The silica and $CaCO_3$ may be present as intermixed or discrete areas.

The silica rich layer is also characterized by a varying silica content from bonding element to bonding element, typically about 50% to about 90% by volume (e.g., from about 60% to about 80%). In certain embodiments, the silica rich layer is generally characterized by a silica content of about 50% to about 90% by volume and a $CaCO_3$ content of about 10% to about 50% by volume. In certain embodiments, the silica rich layer is characterized by a silica content of about 70% to about 90% by volume and a $CaCO_3$ content of about 10% to about 30% by volume. In certain embodiments, the silica rich layer is characterized by a silica content of about 50% to about 70% by volume and a $CaCO_3$ content of about 30% to about 50% by volume.

The silica rich layer may surround the core to various degrees of coverage anywhere from about 1% to about 99% of the outer surface area of the core (e.g., about 10% to about 90%). In certain embodiments, the silica rich layer surrounds the core with a degree of coverage less than about 10% of the outer surface area of the core. In certain embodiments, the silica rich layer of varying thickness surrounds the core with a degree of coverage greater than about 90% of the outer surface area of the core.

A bonding element may exhibit any size and any regular or irregular, solid or hollow morphology, which may be favored one way or another by raw materials selection and the production process in view of the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granules, oblongs, rods, ripples, etc.

The plurality of bonding elements may have any suitable mean particle size and particle size distribution dependent on the desired properties and performance characteristics of the composite product. In certain embodiments, for example, the plurality of bonding elements have a mean particle size of about 1 µm to about 100 µm (e.g., about 1 µm to about 80 µm, about 1 µm to about 60 µm, about 1 µm to about 50 µm, about 1 µm to about 40 µm, about 1 µm to about 30 µm, about 1 µm to about 20 µm, about 1 µm to about 10 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm).

The inter-connected network of bonding elements (a bonding matrix) may also include a plurality of coarse and/or fine filler particles that may be of any suitable material, have any suitable particle size and particle size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of filler particles has a mean particle size of about 5 µm to about 7 mm (e.g., about 5 µm to about 5 mm, about 5 µm to about 4 mm, about 5 µm to about 3 mm, about 5 µm to about 2 mm, about 5 µm to about 1 mm, about 5 µm to about 500 µm, about 5 µm to about 300 µm, about 20 µm to about 5 mm, about 20 µm to about 4 mm, about 20 µm to about 3 mm, about 20 µm to about 2 mm, about 20 µm to about 1 mm, about 20 µm to about 500 µm, about 20 µm to about 300 µm, about 100 µm to about 5 mm, about 100 µm to about 4 mm, about 100 µm to about 3 mm, about 100 µm to about 2 mm, about 100 µm to about 1 mm).

The weight ratio of bonding elements to filler particles may be any suitable ratios dependent on the intended application for the composite material product. For example, the weight ratio of bonding elements to filler particles may be about (5 to 99):about (1 to 95), e.g., about (10 to 99):about (1 to 90), about (20 to 99):about (1 to 80), about (30 to 99):about (1 to 70), about (50 to 90):about (10 to 50), about (70 to 90):about (10 to 30), about (5 to 90):about (10 to 95), about (5 to 80):about (20 to 95), about (5 to 60):about (40 to 95). In certain embodiments depending on the application, the weight ratio of bonding elements to filler particles may be about (10 to 50):about (50 to 90), e.g., about (30 to 50):about (50 to 70), about (40 to 50):about (50 to 60).

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granules, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

In certain preferred embodiments, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, calcium carbonate-rich material and magnesium carbonate-rich material.

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide). The pigment may be of any color or colors, for example, selected from black, white, blue, gray, pink, green, red, yellow and brown. The pigment may be present in any suitable amount depending on the desired composite material, for example in an amount of about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

In certain embodiments, the composite material is characterized by water absorption of less than about 10%, which is measured by soaking the material in water for 24 hours. The mass difference between mass of material soaked for 24 hours and oven dry mass (when dried for 24 hours at 105° C.) divided by oven dry mass to obtain water absorption. In some other embodiments, the composite material is characterized by water absorption of less than about 8%. In some other embodiments the composite material is characterized by water absorption of less than about 5%. In some other embodiments the composite material is characterized by water absorption of less than about 4%. In some other embodiments the composite material is characterized by water absorption of less than about 3%. In some other embodiments the composite material is characterized by water absorption of less than about 2%. In some other embodiments the composite material is characterized by water absorption of less than about 1%.

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

$CO_2$ Control

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a desired level so that curing can be performed thereafter. In simple systems, $CO_2$ gas is then fed into the system at a predefined rate so to maintain a concentration of $CO_2$ sufficient to drive the curing reaction.

In some embodiments, the $CO_2$ gas is blended with air inside the curing chamber to maintain the $CO_2$ concentration at about 30%, or about 40%, or about 45%, or about 50%, or about 60%, or about 65%, or about 70%, or about 75%, or about 80%, or about 85%, or about 90%, or about 95%, or about 99%.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as a nondispersive infrared sensor ("NDIR") should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 9:
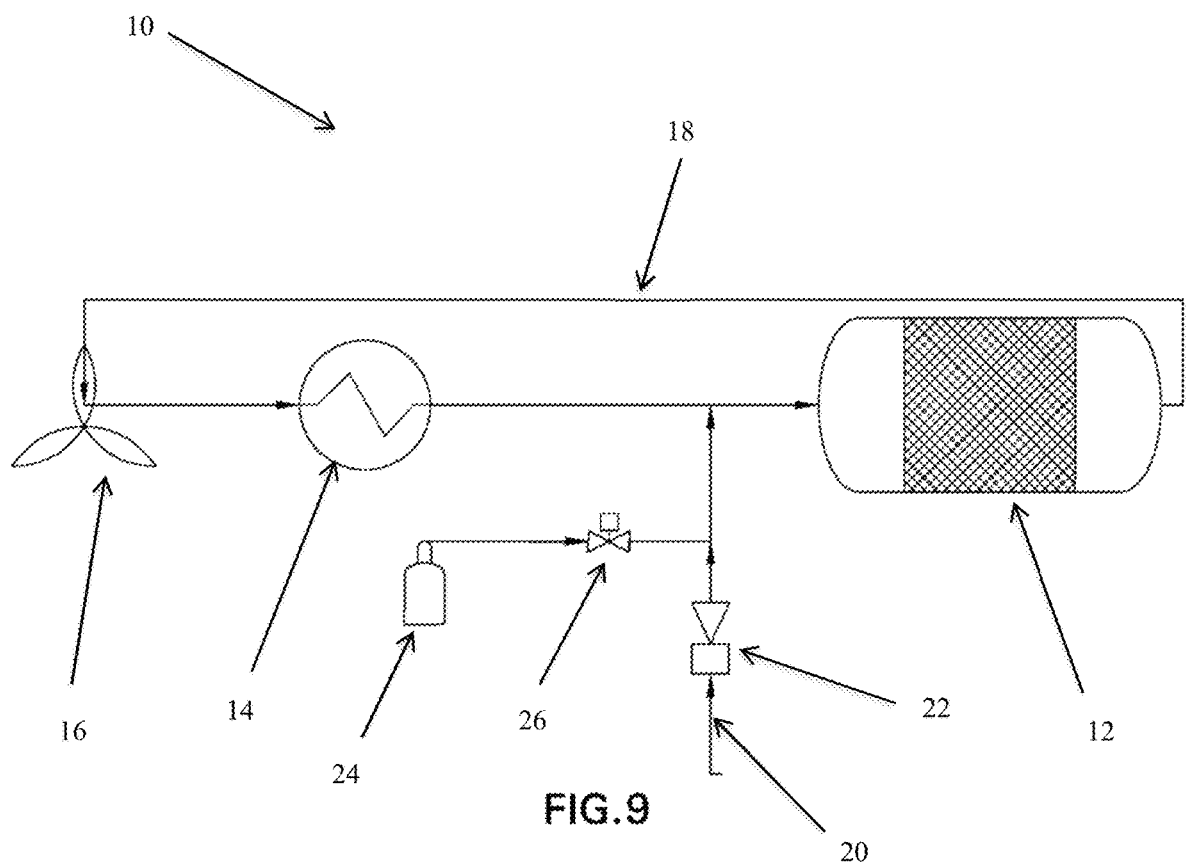
FIG. 9 is a schematic diagram of an exemplary $CO_2$-cured composite material curing chamber that provides humidification according to principles of the invention.

FIG. 9 is a schematic diagram of an exemplary $CO_2$ composite material curing chamber that provides humidification according to principles of the invention. As illustrated therein, the arrangement 10 includes a carbon dioxide curing chamber 12, heat exchanger 14, blower 16, gas recirculation line 18, water line 20, water atomizer or vapor generator 22, carbon dioxide source 24 and proportioning valve 26. In FIG. 9, the water supply 20 is provided and water vapor is added to the atmosphere that is circulating within the curing chamber 12. The water can be any convenient source of potable water. In some embodiments, ordinary tap water is used. In some embodiments, the water can be converted to vapor by the mechanism generically illustrated an element 22. This mechanism can be embodied by, for example, flowing water through a misting nozzle or an atomizing spray nozzle, an electric vapor generator, a gas fired vapor generator, or by being heated above the gas temperature in the chamber 12 so as to cause evaporation from a liquid water supply, an example being a drum reactor with an immersion heater. In yet another embodiment, the $CO_2$ supply 24 can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may be about 1% to about 99% relative humidity. Three different methods for humidity control may exist in $CO_2$ composite material curing processes that could be combined into a single system. One method for humidification in one embodiment of a $CO_2$ curing system is represented in FIG. 9. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 10:
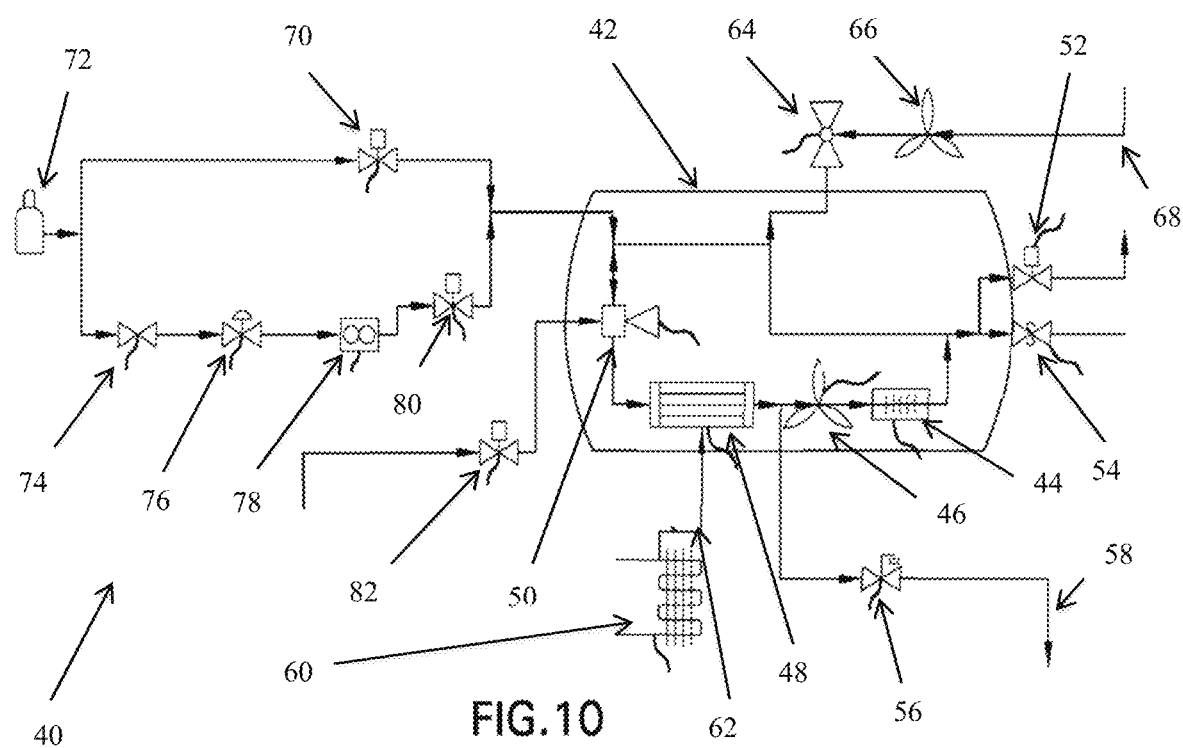
FIG. 10 is a schematic diagram of an exemplary curing chamber with multiple methods of humidity control as well as ability to control and replenish $CO_2$ using constant flow or pressure regulation and that can control the temperature.

FIG. 10 is a schematic diagram of an exemplary arrangement including a curing chamber with multiple methods of humidity control as well as ability to control and replenish $CO_2$ using constant flow or pressure regulation and that can control the temperature according to principles of the invention. As illustrated therein, the arrangement 40 includes a carbon dioxide curing chamber 42, a thin tube heater 44, fan or blower 46, chilling coil 48, water atomizer 50, purge/exhaust valve 52, bleed valve 54, condensate drain 56, condensate discharge line 58, air cooled condenser 60, chilled coolant line 62, fresh air damper valve 64, fresh air intake blower or fan 66, fresh air/atmosphere vent line 68, high flow carbon dioxide solenoid 70, carbon dioxide source 72, pressure regulator 74, low pressure regulator 76, flowmeter controller 78, low-flow carbon dioxide solenoid 80, water spray solenoid 82, and water inlet 84. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an resistance temperature detector (RTD). The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

This disclosure is not limited to the exact contents included herein. Combinations and/or modifications apparent to one of ordinary skill in the art are envisaged within the scope of this disclosure. Some non-limiting examples are described below to illustrate certain aspects of the invention.

EXAMPLES

Low calcium silicate cement-based composite materials, as defined herein, are based on commercially produced Solidia Cement™ by Solidia Technologies Inc. Solidia Concrete™ can be made with Solidia Cement using diverse mixture proportions depending on the target compressive strength, durability and purpose for which concrete is used. The cement in combination with other filler materials like fly ash, slag, VCAS, limestone powder, also called as cementitious material content for one cubic meter of Solidia Concrete™ can be between 250 and 500 kg, preferably between 350 and 450 kg. For one cubic meter of Solidia Concrete™ sand content is between 700 and 1000 kg, ¼" aggregate content is between 500 and 600 kg and ⅜" aggregate content between 400 and 550 kg. In addition to these solid materials, commercial water reducing, and set retarding admixtures, at different dosage levels were used. The cementitious material included Solidia Cement™, which is a low calcium silicate cement, reactive filler materials like fly ash, slag, vitreous calcium alumino silicate (VCAS) and ordinary Portland cement (OPC), non-reactive filler materials like fine limestone powder, silica fume, glass powder. The water reducing admixture can be in the form of a liquid and added in amounts of about 3 ml/kg to about 12 ml/kg of cementitious content, the air entraining agent can be in the form of a liquid and in the form of a liquid and added in amounts of about 1 ml/kg to about 7 ml/kg of cementitious content. The set retarding agent can also be in the form of a liquid and added in amounts of about 3 to about 10 ml/kg, and a corrosion inhibiting admixture can also be in liquid form and added at a dosage level of about 10 to about 30 ml/kg of cement content.

The actual amount of all ingredients used for 2 different types of mixtures is shown in Table 2 and Table 3.

The following standard mixing procedure was used to form the mixes.

a. Pour all the sand in the mixer. Mix it for 30 seconds.
b. Pour 10% of mixing water into the mixer while mixer is running.
c. Add 50% of the coarse aggregates into the mixer.
e. Add all the cementitious materials into the mixer.
f. Add remaining 50% of the coarse aggregates into the mixer.
g. Add 50% of the mixing water followed by water reducing admixture and mix it for 30 seconds to produce partially wet concrete mix.
h. Add set retarding admixture to the partially wet concrete mix and run mixer for 30 seconds.
i. Add remaining water to the wet concrete mix based on visual observation of the mix. If it is too wet, do not put the remaining water.
j. Mix wet concrete mix for 3 minutes in a mixer.
k. Let wet concrete mix sit in the mixer for 1 minute.
l. Mix wet concrete mix for additional 1 minute.

TABLE 2

| Mix 1 | | | |
|---|---|---|---|
| Batch size (kg): | 70 | W/C Ratio | 0.336 |
| % Solids | 94.50% | % Liquid | 5.50% |
| Total Solids (kg) | 66.15 | | |
| Total Liquids (kg) | 3.85 | | |

| Solid Components | Mass % | Mass (kg) |
|---|---|---|
| Cementitious material | 17% | 11.5 |
| Const. sand | 38% | 25.9 |
| — | 0% | 0.0 |
| Trap Rock | 24% | 16.6 |
| ⅜" agg | 20% | 13.4 |
| — | 0% | 0.0 |
| — | | 0.0 |
| | 100% | |
| Water | | 4.55 |
| Adjusted water content | | 3.38 |

| Cement/s | Mass % | Mass (kg) |
|---|---|---|
| PECS | | 11.45 |
| 0 | | 0.00 |
| 0 | | 0.00 |
| — | | 0.00 |

TABLE 2-continued

Mix 1

| Additives | mg/kg | Mass (g) |
|---|---|---|
| Glenium 7500 | 5 | 60.13 |
| 0 | 0 | 0.00 |
| Sika Plastiment | 5 | 57.27 |
| 0 | 0 | 0.00 |
| 0 | 0 | 0.00 |

In the above, PECS stands for Solidia Cement commercially produced in Europe. Adjusted water content refers to the amount of water that needs to be added to achieve the designed water to cement ratio of 0.336.

TABLE 3

Mix 2

| Batch size (kg): | 80 | W/C Ratio | 0.336 |
|---|---|---|---|
| % Solids | 94.50% | % Liquid | 5.50% |
| Total Solids (kg) | 75.6 | | |
| Total Liquids (kg) | 4.4 | | |

| Solid Components | Mass % | Mass (kg) |
|---|---|---|
| cementitious materials | 17% | 13.1 |
| Const. sand | 38% | 29.4 |
| — | — | — |
| Trap Rock | 24% | 17.7 |
| 3/8" agg | 20% | 15.3 |
| — | — | — |
| — | 100% | — |
| Water | | 5.60 |
| Adjusted water content | | 5.67 |

| Cement/s | Mass % | Mass (kg) |
|---|---|---|
| WHL16 | | 13.09 |
| 0 | | 0.00 |
| 0 | | 0.00 |
| — | | 0.00 |
| Additives | mg/kg | Mass (g) |
| Glenium 7500 | 5 | 68.71 |
| 0 | 0 | 0.00 |
| Sika Plastiment | 5 | 65.44 |
| 0 | 0 | 0.00 |
| Accumer 2100 | 0 | 0.00 |

In the above, WHL16 stands for Solidia Cement commercially produced in the USA. Adjusted water content refers to the amount of water that needs to be added to achieve the designed water to cement ratio of 0.336.

Batches of mix 1 (Table 2) and mix 2 (Table 3) were made having the following desired characteristics: moisture content of 6% to 8%; air content of 5% to 10%; slump of 0" to 1.5"; pH of 11 or higher. Initial measurements of these freshly mixed batches were made and showed the following properties.

TABLE 4

| HPB Batch | Air Content | Unit Weight(kg) | Initial Moisture | Slump(in.) |
|---|---|---|---|---|
| 1 | 15.00% | 17.95 | 8.23% | 2.50 |
| 2 | 15.00% | 17.95 | 8.23% | 2.50 |
| 3 | 11.50% | 18.55 | 8.05% | 1.38 |
| 4 | 9.00% | 20.00 | 6.22% | 0.00 |
| 5 | 9.00% | 20.00 | 7.22% | 0.50 |
| 6 | 8.50% | 19.15 | 8.00% | 0.00 |
| 7 | 8.50% | 19.15 | 8.00% | 0.00 |
| 8 | 4.30% | 19.98 | 7.84% | 0.50 |
| 9 | 5.10% | 19.78 | 7.38% | 0.50 |
| 10 | 6.50% | 19.64 | 8.00% | 0.00 |
| 11 | 1.60% | 20.03 | 6.78% | 0.00 |
| 12 | 4.80% | 20.11 | 7.08% | 0.50 |
| 13 | 4.60% | 20.00 | 6.48% | 0.50 |
| 14 | 4.30% | 19.81 | 7.69% | 0.50 |
| 15 | 2.60% | 21.19 | 4.79% | 0.50 |
| 16 | 3.20% | 21.20 | 5.50% | 0.00 |
| 17 | 3.20% | 21.20 | 5.50% | 0.00 |
| 18 | 2.50% | 21.29 | 4.87% | 0.00 |
| 19 | 4.00% | 20.78 | 5.70% | 0.00 |

Samples were prepared by pouring mix 1 or mix 2 into a mold. The molded samples were pre-cured by placement into an environmental chamber for three hours, at 60° C. and 60% RH and hardened to an extent that allowed removal of the samples from their respective mold. Once removed from the mold, the samples were pre-conditioned. The samples were placed onto load cells in order to calibrate and measure weight of water lost at 60° C. and 65% RH. The water loss on each sample was recorded until it was within 2% of the desired moisture content. Samples were then placed into an autoclave and cured under conditions of 60° C., 60% relative humidity (RH), and a $CO_2$ concentration of 55% for up to 85 hours. The pH was measured after mixing (fresh pH), after pre-conditioning (3 hr in the environmental chamber), and after curing for 20, 40, and 60+ hours in the autoclave. The results of these measurements are reported in Table 5 below.

TABLE 5

Matrix of high-pH Durability in Solidia Concrete

| | Precuring Conditions | | | Curing Conditions | | | | |
|---|---|---|---|---|---|---|---|---|
| Batch ID | Fresh pH | % H2O removed | Post PC pH | Time, hrs. | pH | pH Drop | o (psi) | Comments |
| HPB1 | 12.572 | 16.0 | 12.113 | 20 | 10.565 | 2.007 | 1886 | Spacebag PECS |
| HPB1 | 12.572 | 16.0 | | 40 | 9.753 | 2.819 | 2596 | Spacebag PECS |
| HPB1 | 12.572 | 16.0 | | 60 | 9.781 | 2.791 | 2501 | Spacebag PECS |
| HPB2 | 12.512 | 15.0 | 12.045 | 20 | 11.396 | 1.116 | 2056 | Spacebag PECS |
| HPB2 | 12.512 | 15.0 | | 40 | 10.411 | 2.101 | 3144 | Spacebag PECS |
| HPB2 | 12.512 | 15.0 | | 60 | 9.836 | 2.676 | 3459 | Spacebag PECS |
| HPB3 | 12.237 | 19.6 | 11.678 | 20 | 11.263 | 0.974 | 1814 | Spacebag PECS |
| HPB3 | 12.237 | 19.6 | | 40 | 10.053 | 2.184 | 2847 | Spacebag PECS |
| HPB3 | 12.237 | 19.6 | | 60 | 9.707 | 2.53 | 3029 | Spacebag PECS |
| HPB4 | 12.71 | 84.4 | 11.759 | 20 | 11.08 | 1.63 | 2624 | Spacebag PECS |
| HPB4 | 12.71 | 84.4 | | 40 | 10.475 | 2.235 | 3151 | Spacebag PECS |
| HPB4 | 12.71 | 84.4 | | 60 | 10.524 | 2.186 | 3767 | Spacebag PECS Mix-1 |

TABLE 5-continued

Matrix of high-pH Durability in Solidia Concrete

| | Precuring Conditions | | | Curing Conditions | | | | |
|---|---|---|---|---|---|---|---|---|
| Batch ID | Fresh pH | % H2O removed | Post PC pH | Time, hrs. | pH | pH Drop | o (psi) | Comments |
| HPB5 | 12.71 | 39.9 | 11.894 | 20 | 11.74 | 0.97 | 1258 | Spacebag PECS |
| HPB5 | 12.71 | 39.9 | | 40 | 11.782 | 0.928 | 2698 | Spacebag PECS |
| HPB5 | 12.71 | 39.9 | | 60 | 11.79 | 0.92 | 2419 | Spacebag PECS |
| HPB6 | 12.191 | 67.0 | 11.628 | 20 | 10.201 | 1.99 | 2534 | Spacebag PECS |
| HPB6 | 12.191 | 67.0 | | 40 | 10.036 | 2.155 | 3395 | Spacebag PECS |
| HPB6 | 12.191 | 67.0 | | 60 | 10.265 | 1.926 | 3398 | Spacebag PECS |
| HPB7 | 12.191 | 23.8 | 12.124 | 20 | 11.772 | 0.419 | 2004 | Spacebag PECS |
| HPB7 | 12.191 | 23.8 | | 40 | 10.932 | 1.259 | 3118 | Spacebag PECS |
| HPB7 | 12.191 | 23.8 | | 60 | 10.321 | 1.87 | 3690 | Spacebag PECS |
| HPB8 | 12.201 | 41.6 | 12.161 | 20 | 12.024 | 0.177 | 1540 | Spacebag PECS |
| HPB8 | 12.201 | 41.6 | | 40 | 11.817 | 0.384 | 2543 | Spacebag PECS |
| HPB9 | 12.201 | 34.1 | 12.174 | 20 | 12.123 | 0.078 | 933 | WHL 16 | Mix-2 |
| HPB9 | 12.201 | 34.1 | | 40 | 11.976 | 0.225 | 1292 | WHL 16 |
| HPB10 | 12.847 | 34.4 | 12.624 | 20 | 11.807 | 1.04 | 1128 | Spacebag PECS |
| HPB10 | 12.847 | 34.4 | | 40 | 11.777 | 1.07 | 2997 | Spacebag PECS | Mix-1 |
| HPB10 RR | 12.847 | 34.4 | | 80 | 11.342 | 1.505 | 4573 | Spacebag PECS |
| HPB11 | 11.975 | 25.0 | 11.68 | 20 | 10.738 | 1.237 | 1097 | WHL 16 |
| HPB11 | 11.975 | 25.0 | | 40 | 10.312 | 1.663 | 2890 | WHL 16 |
| HPB11 RR | 11.975 | 25.0 | | 80 | 9.931 | 2.044 | 3213.4 | WHL 16 |
| HPB12 | 11.87 | 30.6 | 11.69 | 20 | 11.476 | 0.394 | 2090 | WHL 16 | Mix-2 |
| HPB12 | 11.87 | 30.6 | | 40 | 10.846 | 1.024 | 4112 | WHL 16 |
| HPB12 RR | 11.87 | 30.6 | | 100+ | 10.182 | 1.688 | 8752 | WHL 16 |
| HPB13 | 11.7 | 39.0 | 11.5 | 20 | 11.432 | 0.268 | 1843 | WHL 16 |
| HPB13 | 11.7 | 39.0 | | 40 | 10.805 | 0.895 | 3266 | WHL 16 |
| HPB13 RR | 11.7 | 39.0 | | 100+ | 10.242 | 1.458 | 8763 | WHL 16 | Mix-2 |
| HPB14 | 12.9 | 69.3 | 12.75 | 20 | 12.147 | 0.753 | 2034 | Spacebag PECS |
| HPB14 | 12.9 | 69.3 | | 40 | 11.968 | 0.932 | 3530 | Spacebag PECS | Mix-1 |
| HPB14 RR | 12.9 | 69.3 | | 100+ | 11.022 | 1.878 | 7220 | Spacebag PECS |
| HPB15 | 11.93 | 56.3 | 11.7 | 20 | 11.477 | 0.453 | 2772 | WHL 16 |
| HPB15 | 11.93 | 56.3 | | 40 | 11.654 | 0.276 | 3895 | WHL 16 |
| HPB15 RR | 11.93 | 56.3 | | 100+ | 10.584 | 1.346 | 5520 | WHL 16 | Mix-2 |
| HPB16 | 11.95 | 25.5 | 11.746 | 20 | 11.553 | 0.397 | 1289 | WHL 16 |

The procedure for pH measurement of green, uncured concrete was as follows.

1. First, obtain a sample of the mortar fraction of concrete by vibrating a representative green concrete sample through the next sieve grade smaller than the nominal size of the smallest coarse aggregate. In the case of these batches, the No. 4 sieve is sufficient.

2. Fill a test tube with small amount of mortar to the level just where the probe can reach into the tube.

3. Add deionized water to about a centimeter above the mortar and mix thoroughly.

4. Let the sample settle 1 min. and take the pH measurement. Alternatively, the probe can be placed immediately into the test tube but some time must be allowed to let the reading stabilize.

The procedure for pH measurement of samples after carbonation in $CO_2$ curing chamber was as follows.

1. Take the fractured remains from compression testing of a concrete cylinder, and collect the fine debris. If the debris collected is only from a certain portion of the cylinder, break the cylinder with a sledgehammer until enough debris can be collected for testing.

2. Sieve the debris through a No. 30 sieve to obtain a sample for pH measurement.

3. Fill a test tube with small amount of the debris up to the level just where the probe can reach into the tube.

4. Add deionized water to about a centimeter above the sample and mix thoroughly.

5. Let the sample settle for 1 min. and take the pH measurement. Alternatively, the probe can be placed immediately into the test tube but some time must be allowed to let the reading stabilize.

Figure 12:
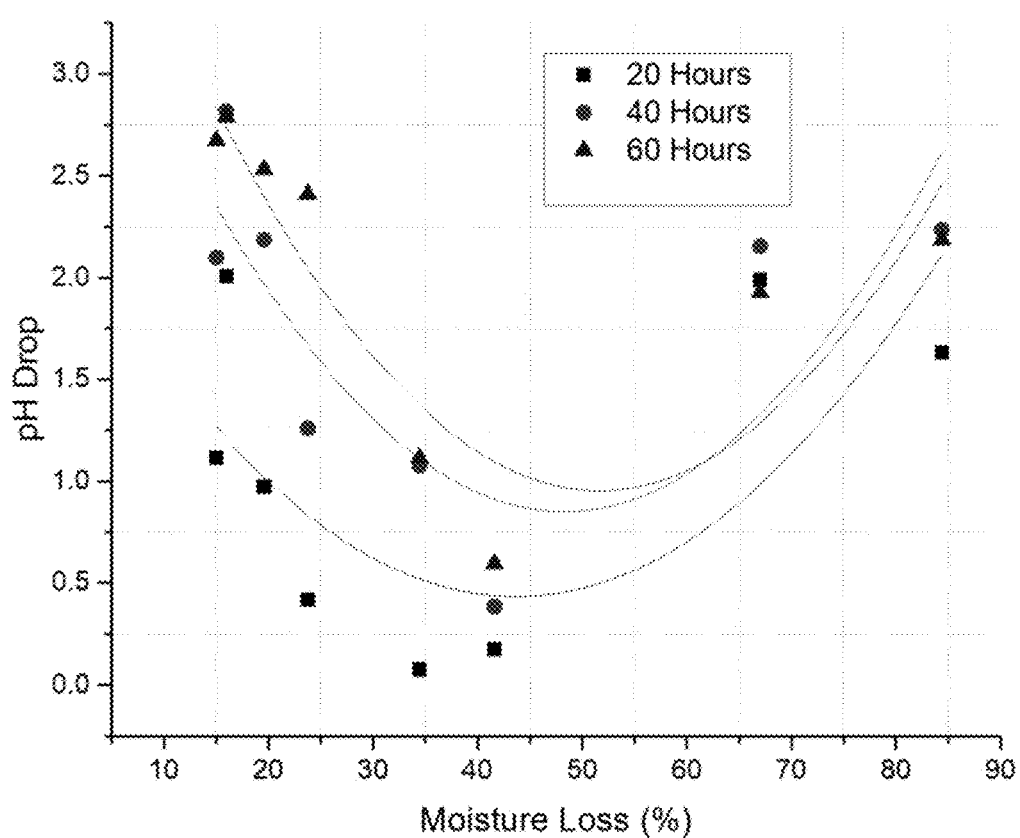
FIG. 12 is a graph showing pH drop as the percent water removed is cured at different durations with Mix 1 cement of the Examples.

The table above shows the findings of each batch (either with Mix-1 (odd batch number) or Mix-2 (even batch number)) and the percentage of water removal and their respective results. The yellow coded cells are an indication of a desired final cured pH, the red cells indicate desired pH drop between initial and final. The green cells show a target compressive strength of more than 3000 psi has been met FIG. 12 shows the pH drop as the percent water removed is cured at different durations with Mix 1 cement.

Figure 13:
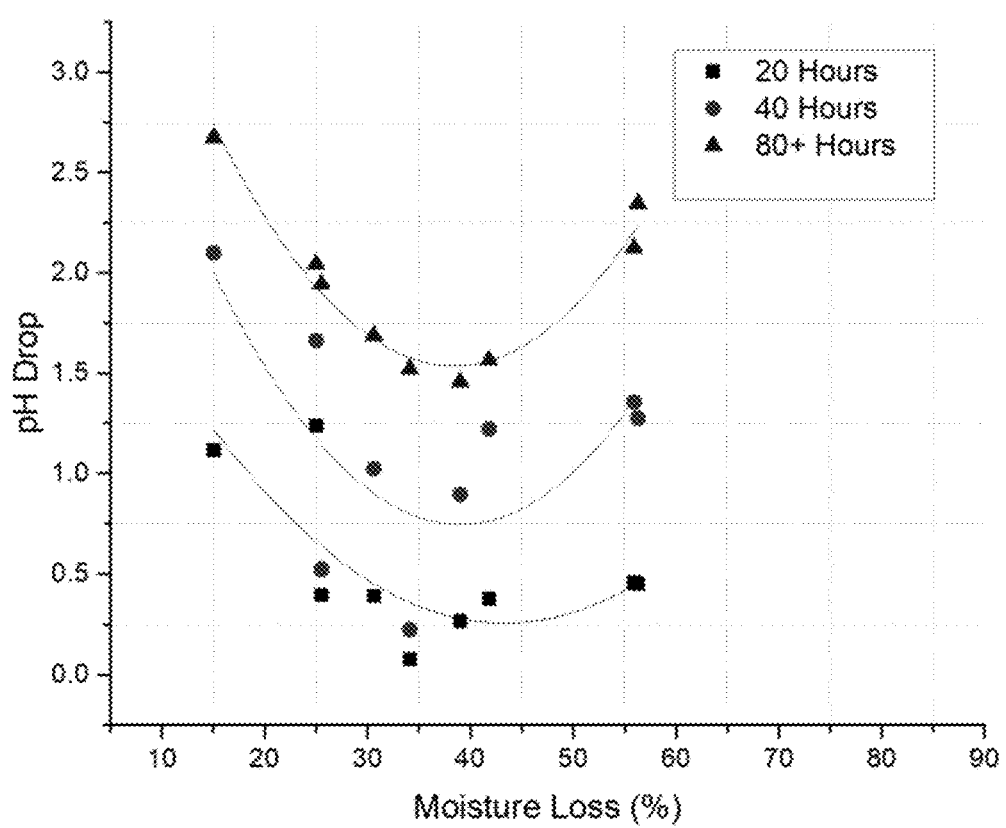
FIG. 13 is a graph showing pH drop as the percent water removed is cured at different durations with Mix 2 cement of the Examples.

FIG. 13 shows the pH drop as the percent water removed is cured at different durations with Mix 2 cement.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

Other embodiments within the scope of the claims herein will be apparent to one skilled in the art from consideration of the specification or practice of the disclosure as disclosed herein. It is intended that the specification be considered exemplary only, with the scope and spirit being indicated by the claims.

In view of the above, it will be seen that the several advantages are achieved and other advantages attained.

As various changes could be made in the above methods and compositions without departing from the scope of the disclosure, it is intended that all matter contained in the above description shall be interpreted as illustrative and not in a limiting sense.

All references cited in this specification are hereby incorporated by reference. The discussion of the references herein is intended merely to summarize the assertions made by the authors and no admission is made that any reference constitutes prior art. Applicants reserve the right to challenge the accuracy and pertinence of the cited references.

Any numbers expressing quantities of ingredients, constituents, reaction conditions, and so forth used in the application are to be understood as being modified in all instances by the term "about." Notwithstanding that the numerical ranges and parameters setting forth, the broad scope of the subject matter presented herein are approximations, the numerical values set forth are indicated as precisely as possible. Any numerical value, however, may inherently contain certain errors or inaccuracies as evident, for example, from the standard deviation found in their respective measurement techniques. None of the features recited herein should be interpreted as invoking 35 U.S.C. § 112, 6, unless the term "means" is explicitly used.

We claim:

1. A method of producing a carbonated composite material, comprising:
   providing a carbonatable cementitious material in particulate form;
   mixing the carbonatable cementitious material with water to produce a mix;
   forming a predetermined shape with the mix, wherein the predetermined shape has an initial pore structure containing an initial pore solution having a first pH;
   pre-conditioning the predetermined shape in an environment comprising ambient air or carbon dioxide to remove a predetermined amount of the water from the predetermined shape to produce a pre-conditioned shape;
   carbonating the pre-conditioned shape in an environment comprising carbon dioxide to produce a modified pore structure containing a modified pore solution having a second pH, wherein the difference between the first pH and the second pH is represented by a $\Delta pH$, and the $\Delta pH$ is 1.0 or less.

2. The method of claim 1, wherein the first pH is 11.5 or greater.

3. The method of claim 1, wherein the second pH is at least about 9.5 to about 11.5.

4. The method of claim 1, wherein the carbonation of the pre-conditioned shape forms one or more bonding elements, wherein each bonding element comprises;
   a core, wherein the core has a first chemical composition that includes one or more chemical elements;
   a silica-rich first layer at least partially covering a peripheral portion of the core; and
   a calcium carbonate and/or magnesium carbonate-rich second layer at least partially covering a peripheral portion of the first layer.

5. The method of claim 1, wherein the predetermined amount of water removed from the predetermined shape during the pre-conditioning is 20 to 70%.

6. The method of claim 5, wherein the predetermined amount of water removed from the predetermined shape during the pre-conditioning is 40 to 50%.

7. The method of claim 1, wherein the pre-conditioning is performed in an environment comprising carbon dioxide, and the concentration of carbon dioxide is greater than 0% to 50%.

8. The method of claim 1, wherein the concentration of carbon dioxide during carbonation of the pre-conditioned shape is 10% to 100%.

9. The method of claim 1, wherein the concentration of carbon dioxide during carbonation of the pre-conditioned shape is 50% to 99%.

10. The method of claim 1, further comprising:
    forming the predetermined shape with the mix by pouring the mix into a mold; and
    pre-curing the mix while in the mold to at least a hardness sufficient to allow removal of the mold.

11. The method of claim 1, wherein the mix comprises aggregates.

12. The method of claim 11, wherein the aggregates have a particle size ranging from 0.25 mm to about 25 mm.

13. The method of claim 11, wherein the aggregates comprise sand.

14. The method of claim 11, wherein the aggregates comprise gravel, trap rock or granite stone.

15. The method of claim 13, wherein the sand is dolomitic.

16. The method of claim 13, wherein the sand is silica-based.

17. The method of claim 1, wherein the mix further comprises at least one pH enhancing additive in an amount of about 1% to about 30%, by mass, based on the total amount of cementitious materials.

18. The method of claim 17, wherein the at least one pH enhancing additive is chosen from: calcium nitrate tetrahydrate, calcium nitrite, NaOH, sodium bicarbonate, ordinary portland cement, sodium silicate, deadburned CaO, deadburned MgO, concrete recycled material (CRM), slag aggregate, and combinations thereof.

* * * * *